United States Patent [19]
Rinard

[11] Patent Number: 5,280,990
[45] Date of Patent: Jan. 25, 1994

[54] VEHICLE DRAG REDUCTION SYSTEM

[76] Inventor: Gordon L. Rinard, 2362 Crozier St., Muskegon, Mich. 49441

[21] Appl. No.: 47,166

[22] Filed: Apr. 13, 1993

Related U.S. Application Data

[63] Continuation of Ser. No. 772,963, Oct. 8, 1991, abandoned.

[51] Int. Cl.⁵ .............................................. B62D 35/00
[52] U.S. Cl. ............................... 296/180.1; 296/180.4; 296/180.5; 296/37.6; 296/91
[58] Field of Search .......... 296/91, 37.6, 180.1–180.5; 180/903; 105/1.1–1.3

[56] References Cited

U.S. PATENT DOCUMENTS

| | | | |
|---|---|---|---|
| 3,010,754 | 11/1961 | Shumaker | 296/91 |
| 3,711,146 | 1/1973 | Madzsar et al. | 296/180.2 |
| 3,960,402 | 6/1976 | Keck | 296/180.4 |
| 3,999,797 | 12/1976 | Kirsch et al. | 296/180.4 |
| 4,021,069 | 5/1977 | Hersh | 296/180.4 |
| 4,320,920 | 3/1982 | Goudey | 296/180.4 |
| 4,379,582 | 4/1983 | Miwa | 296/180.5 |
| 4,386,801 | 6/1983 | Chapman et al. | 296/180.1 |
| 4,486,046 | 12/1984 | Whitney et al. | 296/180.4 |
| 4,611,847 | 9/1986 | Sullivan | 296/180.2 |
| 4,746,160 | 5/1988 | Wiesemeyer | 296/180.4 X |

FOREIGN PATENT DOCUMENTS 2228456 8/1990 United Kingdom ............. 296/180.4

*Primary Examiner*—Dennis H. Pedder
*Attorney, Agent, or Firm*—Varnum, Riddering, Schmidt & Howlett

[57] ABSTRACT

Vehicle mountable subsystems include a modified nose cone, deflecting air between the trailer and its tractor. Drag at the rear is reduced by vertical vanes at its rear corners, mounted by spring biased supports to allow opening rear doors and restoring the deflecting positions upon closing. Air from the top is deflected downwardly across the rear through a transverse upper scoop. A transverse lower scoop directs air from under the trailer upwardly across its rear surface. Both scoops are fabricated from a resilient material to allow compression against a loading dock structure. An undercarriage enclosure, fabricated into a number of longitudinal segments determined by trailer length, having side skirts and a trailer width upper panel, includes an air deflecting front surface and a channeled rear transverse surface. Flexible skirt extension panels depend toward the roadway.

41 Claims, 5 Drawing Sheets

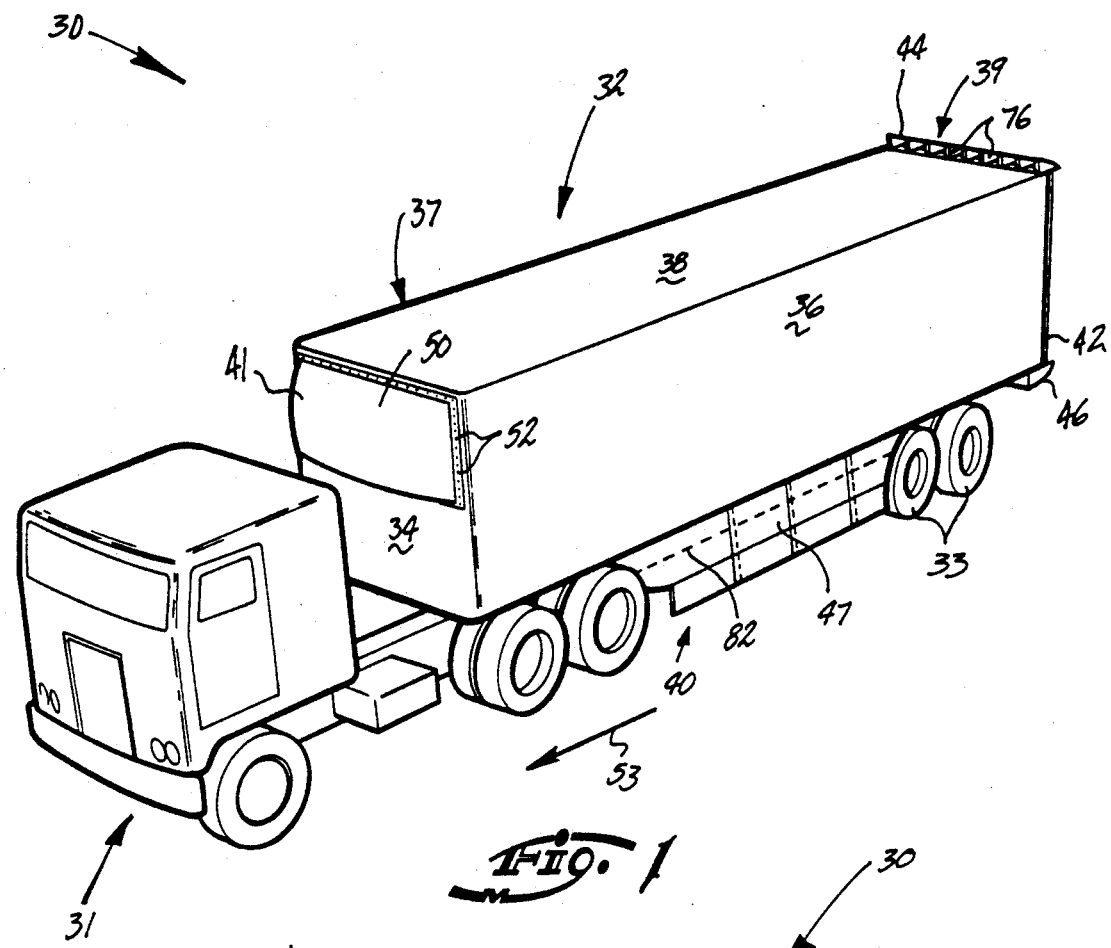
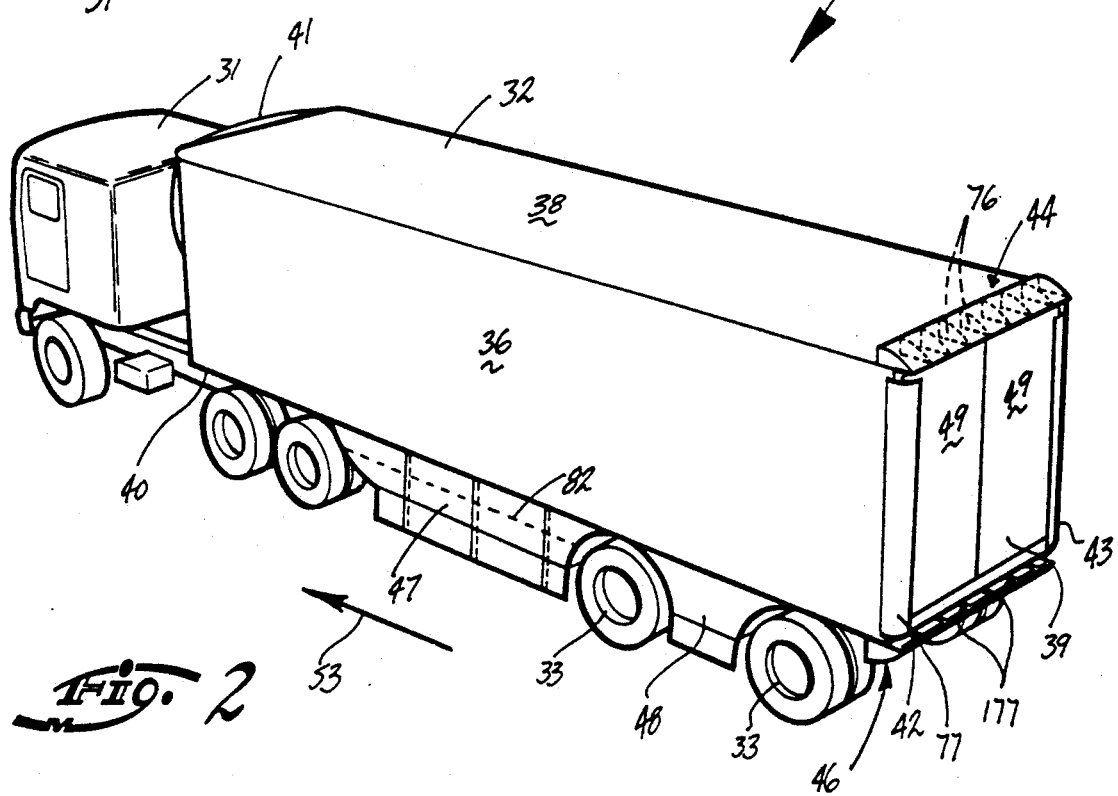

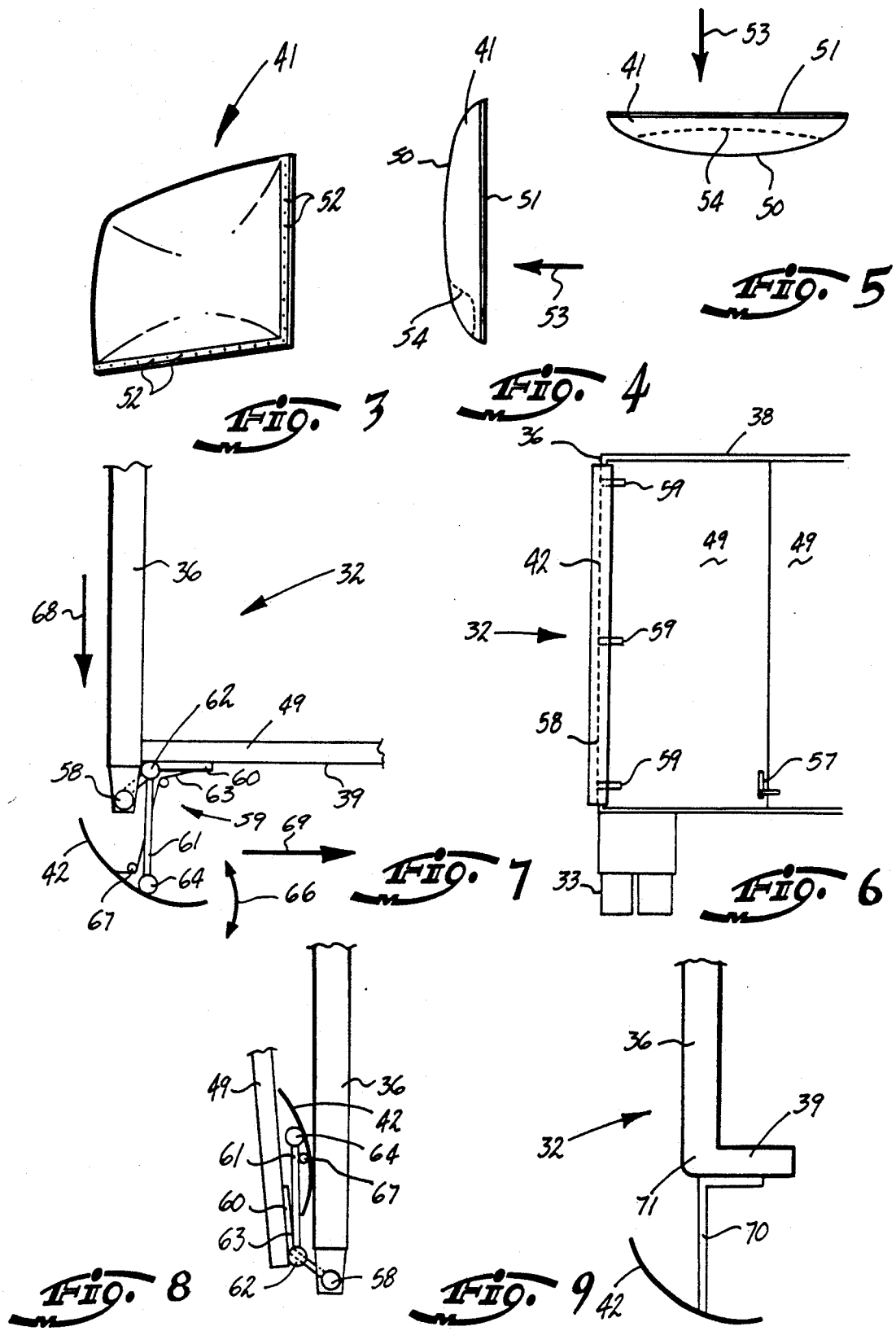

VEHICLE DRAG REDUCTION SYSTEM

This is a continuation of application Ser. No. 07/772,963, filed Oct. 8, 1991, now abandoned.

BACKGROUND OF THE INVENTION

1. Field of the Invention

This invention relates to devices for reducing air flow resistance and drag on trucks, semitrailers, and other vehicles, and, more particularly, to devices for introducing air from airstreams passing around the vehicle into drag creating volumes at the rear of the vehicle, beneath such vehicle, and between units of a combination vehicle.

2. Description of the Prior Art

Fuel conservation and the operational economies associated therewith have become increasingly important, particularly to businesses involved in long distance highway cargo transport. Heretofore, most designers attempting to improve fuel utilization efficiency have addressed reduction of resistance of the vehicle to passage through the air. However some efforts have been directed toward reduction of drag.

As a vehicle progresses along its path, the volume of air immediately in front of the vehicle acts as a barrier, reducing fuel economy. Significant advances have been made in aerodynamic design of semitrailer tractors, including the incorporation of deflectors. Some of these deflectors even provide for deflection of air over or around a substantially vertical planar front surface of a trailer body. Additionally, cone-shaped appliances have been constructed for attachment to the front surface of a trailer body to aid in deflecting air around the trailer. An elementary version of an airstream deflector is described in U.S. Pat. No. 4,159,845 to Bratsberg.

In addition to air flow resistance, fuel economy is adversely affected by drag caused by the creation of volumes of air having a reduced pressure, primarily at the rear of the vehicle, among irregular structure under the vehicle, and between units of a combination vehicle. Considering the rear of the vehicle, the airstreams passing over the top of the vehicle and along its sides tends to attempt to enter the volume immediately to the rear of the rear surface of the vehicle, but is impeded in so moving by turbulance caused by the passage of the vehicle. Thus, the vehicle is, in effect, pulling this turbulent volume along with its passage. Several alternate methods of eliminating this volume of turbulent, drag inducing air are taught in the prior art. A first approach is to deflect a portion of the airstreams passing along the sides of the vehicle into a flow path substantially parallel to the rear surface of the vehicle, as described in U.S. Pat. No. 3,072,431 to Schumaker, U.S. Pat. No. 3,960,402 to Keck, U.S. Pat. No. 4,214,787 to Chain, or U.S. Pat. No. 4,433,865 to Crompton, Jr. Schumaker employs a pair of arcuate deflector vanes attached vertically to rear vertical corner edges of the trailer, the attachment providing that a portion of each vane projects into the air stream passing along the sides of the vehicle, within state and federal width restrictions, to capture a portion of the air flow and deflect to into the drag volume region. Keck adds a horizontal vane attached along the top rear corner edge so as to downwardly deflect a portion of the air flowing along the top surface of the trailer into the drag volume region. Chain adds hydraulic actuators to the vane so that either flat or arcuate vanes may be varied in their angular positions to vary the volume of air deflected into the drag region. Crompton, Jr., while not specifically addressing deflection of air for the purpose of drag reduction, utilizes vertical vanes that are coupled together in a manner such that when one vane is deflected toward a longitudinal vehicle center line, the other vane is caused to move outwardly from that center line. When both vanes are in their rest position, their trailing edges project slightly outwardly away from the center line. The passage of another vehicle, usually in an opposed direction, causes the rear of the trailer to sway from buffeting by the air stream of the passing vehicle. The vane on that side of the vehicle is then deflected inwardly, with its coupled mate being moved outwardly further into the air stream along the other side of the vehicle, which sets up a countering force to overcome the sway tendency. Unless care is taken in the design of the vanes of Crompton, Jr., the vanes may provide an increased drag volume region at the rear of the vehicle.

A second approach to drag reduction appearing in the prior art can be categorized as structurally altering the shape of the rear of the vehicle to form a boat tail structure which aids in allowing a generally laminar air flow along such extended structure, thus removing the turbulent drag inducing volume region, as taught by Keedy in U.S. Pat. No. 4,142,755 or Scanlon in U.S. Pat. No. 4,818,015.

Since even minor reductions in wind flow resistance and drag can result in significant economic savings over long distance vehicle operations, the prior art has addressed drag reduction between units of a combination vehicle and some consideration has been given to air flow problems arising beneath the vehicle. Some prior art has provided skirts to cover gaps between a tractor unit and its trailer, as well as skirts depending toward the roadway to partially enclose the undercarriage. U.S. Pat. No. 4,611,847 to Sullivan describes downwardly extendable, inflatable side skirts to help guide air along the external sides of the vehicle combination and to attempt to channel air flowing under the vehicle into a generally forward to rear path. U.S. Pat. No. 4,746,160 to Weisemeyer combines these features with vehicle streamlining and the use of deflectors.

Since the undercarriage of a trailer usually includes transverse chassis beams, axles, landing gear, equipment storage, and other irregular elements, earlier efforts in this area have been minimal, other than with the side skirts mentioned above. However, U.S. Pat. No. 1,726,158 to Masury, et.al., teaches suspending a magnet transverse to the vehicle path in front of the tires and in proximity to the roadway such that the magnet will pick up nails and other magnetic material that may puncture the tires. Subsequently, Thompson, in U.S. Pat. No. 3,874,697, considers the adverse effects of water and other materials that are picked up by the tires and carried therealong to be expelled in a generally forward direction near the top of revolution of the tire. Thompson thus adds a deflector shield, in the form of an arcuate, channeled panel, which is disposed across the underside of the vehicle longitudinally adjacent the wheels to deflect water, snow, and air flow downwardly rather than in opposition to vehicle travel. Fitzgerald, et.al., in U.S. Pat. No. 4,640,541, describes a device placed transversely between tandem rear axles and wheels which directs air flow, water, snow, and the like laterally downwardly toward the space transversely between opposed wheels of a single axle.

Grooves or channels in an arcuate surface of the device are used to accomplish this deflection.

Based on the above, no single reference appears to address all aspects of air resistance and drag reduction, even though most of the more important causes of reduced fuel economy appear to have been given consideration. The sole exception to these factors seems to rest in the area of treatment of the vehicle undercarriage. It should also be noted that the prior art appears limited to addressing situations wherein the air streams around a vehicle are substantially along the direction of its travel. Recent studies indicate that certain of the above-described drag reduction techniques may be of limited usefulness when transverse wind conditions impinge upon the vehicle. Such studies further suggest that drag may even be increased under such conditions. Yet another question of use of such devices arises when loading or unloading of the vehicle is taken into account. Since many cargo vehicles provide access through doors on the rear surface, such devices may interfere with opening and closing the loading doors. Additionally, when the vehicle is backed into some loading dock facilities, the deflector vanes and other such drag reduction devices may be damaged by, or otherwise interfere with, contact with the loading dock structure.

SUMMARY OF THE INVENTION

Accordingly, an object of the present invention is to provide a plurality of differing devices, appropriately attachable to corresponding portions of a vehicle or combination, said devices being suitable for reducing wind resistance and drag.

Another object of the present invention is to provide a plurality of differing devices that may be individually deployed on a vehicle or combination in a variety of configurations.

An additional object of the present invention is to provide deflector vane elements at the rear of a vehicle, attached in a manner allowing rear planar doors of the vehicle to be fully opened without removal of said vanes, said vanes assuming their operative deflecting positions as said rear loading doors are closed.

A further object of the present invention is to provide an undercarriage enclosure device for channeling air flow substantially longitudinally under the vehicle in a substantially laminar flow manner, said enclosure shielding transverse chassis elements, landing gear, equipments, and other elements typically deployed under such a vehicle from impeding such front to rear air flow.

It is another object of the present invention to provide an undercarriage enclosure device which includes, forward and rear rigid closure panels, an upper closure panel, downwardly extending side skirt panels, and further downwardly extending flexible side skirts approaching roadway level.

It is an additional object of the present invention to provide an undercarriage enclosure device that is adaptable to accommodate internal storage of equipment, spare tires, pallets, and the like.

It is a further object of the present invention to provide an undercarriage enclosure device that may be fabricated to have a capability of telescoping in length along the extent of a vehicle to accommodate a slidable vehicle rear axle.

It is also an object of the present invention to provide deflecting vanes, air scoops, and the like that are fabricated from a deformable, resilient material.

Yet another object of the present invention is to provide devices attachable to front surfaces of vehicles, said devices being adapted to reduce wind resistance thereat and to direct a portion of air impinging thereon into gap portions between a tractor and its trailer.

A still further object of the present invention is to provide a plurality of differing devices that are attachable to a vehicle or combination in a manner adapted to permit being readily removed and reattached to facilitate maintenance and the like.

These, and other objects, features, and advantages of the present invention that may become apparent to those skilled in the art through the subsequent descriptions, drawings, and claims, are provided by a family of independently usable drag reduction and air resistance reducing devices addressing reduction of air resistance caused by passage of the vehicle through the environment along a roadway, reduction of drag caused by gaps between units of a vehicle combination and at a rear surface of the vehicle, and reduction of both air resistance and drag caused by passage of air beneath the vehicle. Each elemental device of the present system is best described individually in context with that portion of fuel operational economy sought to be improved, together with regard for other operational considerations. It is left for the user to determine an appropriate combination of the component elements of the present invention to be employed for a particular vehicle or combination.

Other than redesign of a tractor for streamlining, wind resistance is reduced principally by the incorporation, on the front of a trailer or body, of a forwardly projecting ogival structure. This structure is shaped to be similar to a nose cone covering substantially all of the front surface of the trailer or body that is not forwardly obscured by the tractor or cab. The primary purpose of the nose cone shaped structure is to provide a reduced surface area initially penetrating into the ambient air mass ahead of the vehicle. It should be noted that this air mass may have motion of its own. The air is then diverted to flow around the nose cone and subsequently along the top and sides of the trailer rather than being compressed ahead of the vehicle as it progresses along the roadway. That portion of the front surface of the trailer or body that is shielded by the tractor or cab is generally left as a planar surface since ambient air in that path has been deflected by the tractor or cab. Such a nose cone structure is fabricated to be of light weight having sufficient external rigidity so as to be substantially non-deformed by air pressure from motion of the vehicle.

Reduction of drag arising from creation of a turbulent bubble volume at and rearwardly proximate to the rear transverse surface of the vehicle is provided by attaching a pair of arcuate vanes respectively to opposed vertical corner edges of the rear surface of the vehicle structure. As viewed downwardly from a position above the vane, the vane is configured to be arcuately concave toward the corresponding corner edge, with a portion of the vane projecting transversely outwardly, within vehicle width legal restrictions, beyond the width of the rear surface structure. Such vanes typically extend through substantially the full vertical height of the rear structure of the vehicle. The concave shape captures a portion of the air strem flowing along the side of the vehicle and deflects it to flow substantially parallel to the rear surface of the vehicle toward the opposite vertical corner edge.

For a vehicle having swinging rear loading doors, which generally encompass the entire rear surface of the vehicle, the vertical vanes are mounted from the vertical side corners of the rear doors by a plurality of vertically spaced apart articulated support bracket assemblies. The vane is attached to the distal ends of arms of its set of support bracket assemblies so as to be capable of pivoting thereabout between its deployed deflecting orientation and an orientation wherein the vane structure is substantially parallel with the extent of the arms. A spring bias is provided on each arm to hold the vane in its deployed deflecting orientation. The arms are further pivoted about vertical axes located proximate to the attachment of the support bracket assembly to the rear of the vehicle such that the arm may pivot between its deployed deflecting orientation and an orientation wherein the arm is substantially horizontally parallel with the vertical surface of the rear door. A second spring bias means is provided to hold the arm at its deployed orientation. In use, when the swinging rear door is closed, the arms of the support bracket assemblies and the vertical vanes are deployed to their respective deflecting orientations by action of the first and second spring bias means. As the swinging rear door is opened, it is generally pivoted about its vertical hinge axis to a position forwardly parallelly adjacent the exterior of the corresponding side of the vehicle structure. During the final stages of such pivoting of the rear door, the vane will first come into contact with the vehicle side and, as pivoting of the door continues, the vane will pivot about the distal ends of the arms against the corresponding first spring bias means. Subsequently, further opening pivoting of the rear door will cause the arms to pivot about the second axes against the action of the second spring bias means, resulting in a stowed orientation wherein the rear door is fully open and latched to the side of the vehicle, with the folded vane and arms disposed between the rear door and the vehicle side. As the door is pivoted during closing thereof, the first and second spring bias means act accordingly to restore the arms and the vanes to the deployed deflecting orientation as the door is fully closed to form the rear surface of the vehicle.

For a vehicle not equipped with swinging rear loading doors, the vertical vanes may be rigidly mounted by a plurality of rigid standoff brackets appropriately coupled to the rear vertical corner edges of the vehicle structure. However, it may be useful to provide such vehicles with the foldable vanes and arms if situations may arise wherein the vehicle may be subjected to intentional backing against a loading dock or other structure.

Additional air flow into the turbulent bubble volume at the rear of the vehicle is accomplished by affixing a downwardly concave vane horizontally transversely across the upper rear corner edge of the vehicle such that a portion of the air stream flowing along the top surface of the vehicle is deflected downwardly to flow substantially parallel to the rear surface of the vehicle. This upper deflection device may take the form of a scoop having a low vertical profile. Similarly, an air scoop affixed transversely across the lower rear corner edge of the vehicle is provided to deflect air flowing under the vehicle upwardly in a direction substantially parallel with the rear surface of the vehicle.

As the air from the several vanes and scoops progresses across the rear surface of the vehicle, a confluence arises substantially at a geometric centroid of the rear surface, from which the volume of air is rearwardly dispersed to fill the volume otherwise occupied by the drag creating turbulent bubble. At least the upper and the lower scoops are preferred to be fabricated from a deformable, resilient material to enable non-destructive compression thereof against loading dock structures.

A drag creating volume arising in a gap region between a tractor and its towed trailer may be partially filled by deflecting air thereinto by an appropriately disposed and mounted arcuate vane oriented transversely along a lower front corner edge of the trailer so as to be upwardly concave in a forward direction to add additional deflected air into the gap drag region. In this manner, side skirts and top mounted fairings to enclose the gap region are not required.

The present invention also includes fabrication of an undercarriage enclosure, preferrably of a rigid material, formed into a substantially rectangular box-like structure, generally open on a lower horizontal surface, attached to the underside of the trailer. The forward transverse surface of this enclosure may have a convex shape to guide air flow toward the sides of the vehicle. Necessary equipments typically carried under the trailer are all to be enclosed by the closure structure. Of course, access panels are to be included to enable use and servicing of these equipments. The closure structure depends toward the roadway surface by a distance allowing a sufficient road clearance. The rear transverse surface of the closure structure is configured to include a plurality of channels tending to direct air flowing under the vehicle between the transverse separation between wheels on a common axle.

The herein system also includes attaching flexible side skirts along the lower side corner edges of the closure structure so as to approach the roadway surface. The flexibility of these skirts provides for non-interfering contact between the bottom edges of the skirts and irregularities in the roadway surface, such as curbs.

For vehicles that are equipped with a single rear axle or tandem rear axles that may be relocatably translated in a forward direction along the vehicle undercarriage, to accommodate particular loading configurations, the closure structure is fabricated into a forward section and a rearward section that telescope together in the longitudinal direction of the vehicle. An auxilliary closure structure is provided for attachment to the vehicle undercarriage following the so forwardly translated rear axles or to be placed between separated tandem rear axles.

As previously indicated, the several component element structures of the herein system may be individually utilized, or may be incorporated onto a vehicle in any combination.

BRIEF DESCRIPTION OF THE DRAWING

In the drawing, wherein like reference numbers and symbols refer to like elements and features throughout:

FIG. 1 shows a forward perspective view of a semi-trailer vehicle equipped with a drag reduction system in accordance with the present invention;

FIG. 2 shows a rear perspective view of a semi-trailer vehicle equipped with a drag reduction system in accordance with the present invention;

FIG. 3 is a persepective view of a nose cone element of the present invention;

FIG. 4 gives a side view of the nose cone of FIG. 3;

FIG. 5 gives a top view of the nose cone of FIG. 3;

FIG. 6 illustrates a forward looking view of a fragmentary portion of the rear of a vehicle equipped with vertical vane elements of the present invention;

FIG. 7 is a top view of the left side vertical vane shown in FIG. 6;

FIG. 8 illustrates the configuration assumed by the left side vertical vane of FIG. 7 when a rear door of the vehicle is fully opened;

FIG. 9 illustrates a mounting arrangement of a left side vertical vane onto a vehicle not equipped with rear swinging doors;

DESCRIPTION OF THE PREFERRED EMBODIMENTS

Figure 10:
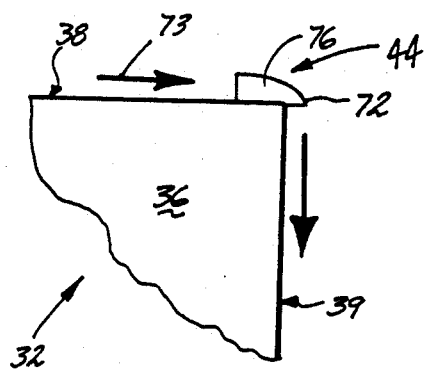
FIG. 10 presents a fragmentary side view of an upper rear corner of a trailer equipped with an upper air scoop element in accordance with the present invention.

Referring first to FIG. 1 and FIG. 2, a typical semitrailer vehicle, indicated generally at 30, is illustrated in perspective view, FIG. 1, as observed from an elevated position forward and to the left of the vehicle 30 and FIG. 2, as observed from an elevated position behind and to the left of the vehicle 30. The vehicle 30 is comprised of a tractor 31 and a trailer 32. The trailer 32, in such a vehicle, travels upon one or more rear axles 33, with its forward end portion pivotably supported by a rear portion of the tractor 31.

For purposes of description, the trailer 32 is generally configured as a structure enclosing a rectangular parallelopiped volume, the structure having a front surface 34, a left side surface 36, a right side surface 37, a top surface 38, a rear surface 39, and a lower surface, chassis, and other equipments indicated generally at 40.

As illustrated, the trailer 32 is equipped with a drag reduction system in accordance with the present invention, including a nose cone 41, a left side vertical rear air deflection vane 42, a right side vertical rear air deflection vane 43, a rear transverse upper air scoop 44, a rear transverse lower air scoop 46, and an undercarriage enclosure assembly 47. With particularly reference to FIG. 2, the trailer 32 is illustrated to be equipped with a second rear axle 33 located appreciably forward of the rearmost axle 33, for load distribution accommodation. Other trailer configurations (not illustrated) are equipped with a rear axle assembly, having one or more axles, that is slidably translatable, as an assembly, in a forward and rearward direction beneath the trailer and locked at an appropriate longitudinal station for load accommodation. Said trailer vehicle 32 is shown to be further equipped with a secondary undercarriage enclosure assembly 48. It is to be further noted that the trailer 32 is shown to have rear swinging doors 49 for loading and unloading.

The first component of the present drag reduction system is the nose cone 41, which has had many earlier manifestations in the prior art. Referring next to FIG. 3, FIG. 4, and FIG. 5, the nose cone 41 is shown, respectively, in perspective, from the left side, and from the top. The nose cone 41 is fabricated from a light weight sheet material having substantial rigidity so as enable the sheet material to be formed to have substantially universally convex surface 50, having forward curvature relative to a planar rectangular area 51 bounding said sheet material. A plurality of mounting holes 52 are formed around the periphery of said rectangular area 51 so that the nose cone 41 may be suitably mounted to the front transversely vertical planar surface 34 of the trailer 32. The nose cone 41 is generally dimensioned to have a width substantially equal to, but less than, a width of the trailer 32, and a height extending downwardly from the top surface 38 of the trailer 32 to an elevation substantially equal to the maximum elevation of the tractor 31. As can be noted with particular reference to FIG. 4 and FIG. 5, the convex surface 50 presents a rounded, air deflecting surface in a direction of forward travel of the vehicle 30, indicated by an arrow 53.

The inclusion of a concave region 54 on a lower portion of the convex surface 50 enables a portion of the air impinging on the nose cone 41 during forward travel of the vehicle 30 to be downwardly deflected into a structurally unoccupied volume 56 (FIG. 1 and FIG. 2) between the tractor 31 and the front 34 of the trailer 32.

In alternate embodiments, the nose cone 41 may be integrally formed as part of the front vertical transverse surface 34 of the trailer 32. The nose cone 41, may include provision for one or more running lights, appropriately distributed thereon. The nose cone 41 may also be decoratively adorned, including the display of logos or other designs.

Referring next to FIG. 6, a rear vertical transverse surface 39 of the trailer 32 is fragmentarily illustrated to show a left rear swinging door 49 and a portion of a right swinging door 49, both in a closed position. The doors 49 are typically held in the illustrated closed position by a latch mechanism 57. For brevity, only the left portion of the rear of the trailer will be described in detail, the right portion mirroring the described left portion in all significant details.

The left door 49 pivots about a vertical axis 58 coupled to a left rear vertical corner edge of the trailer 32 so that, when the doors 49 are both fully open, substantially the entire interior of the trailer 32, as represented by a transverse vertical cross-section of the trailer 32, is exposed from the rear. The left door 49 is generally pivoted fully about its vertical axis 58 through an angle of approximately 270 degrees of angle, to an open position wherein the left door 49 is substantially parallel to an outer surface of a left side wall 36 of the trailer 32. In the illustration of FIG. 6, the planar surface extent of the open left door 49 would thus extend into the plane of the illustration.

A plurality of vane mounting brackets 59 (of which three are illustrated) are coupled to the outer surface of the left door 49 in a vertically spaced apart arrangement so as to support the left side vertical rear air deflection vane 42.

Referring next to FIG. 7, as a left rear corner of the trailer 32 is viewed from above, with the left swinging door 49 in its closed position, the left wall 36 of the trailer 32 and the left door 49 form a right angle, toward the interior of the trailer 32. Each vane mounting bracket 59 is shown to be an assembly of a substantially horizontal first arm 60, coupled rigidly to the door 49, a rearwardly extending, substantially horizontal second arm 61, pivotably coupled at a first end thereof to said first arm 60 by a substantially vertical pivot axis 62, and a first spring means 63 coupled between said first arm 60 and said second arm 61, biasing said second arm 61 to maintain a horizontal right angle relationship with respect to said first arm 60. A second end of the second arm 61 is provided with a second vertical pivot axis 64 about which the left side vertical rear air deflection vane 42 may pivot in a direction indicated by an arcuate arrow 66. A second spring means 67 is coupled between said second arm 61 and said vane 42, biasing said vane 42 to maintain its angular positional orientation relative to said second end of said second arm 61, even when air flowing, at a substantial velocity, along the side 36 of the trailer 32 in a direction indicated by an arrow 68 impinges on the concave arcuate surface of the vane 42 so as to be deflected across the rear of the vehicle, as indicated by an arrow 69.

Referring next to FIG. 8, during opening the left rear door 49 of the trailer 32 to its fully open position, whereat the planar area of said door 49 is substantially parallel to the left side 36 of the trailer 32, having pivoted about its axis 58 through approximately 270 degrees of angle, the left vane 42 becomes pivoted about the second pivot axis 64, against the bias of the second spring means 67, by contact of the vane 42 with the left side 36 of the trailer 32 such that the vane 42 and the second arm 61 assume a substantially parallel planar arrangement. Continued opening of the door 49 to further approach its fully open position then causes the second arm 61, with the vane 42, to pivot about the first pivot axis 62, against the bias of the first spring means 63, by continued contact of the vane 42 on the left side 36 of the trailer 32 such that the second arm 61 and the vane 42 assume a substantially parallel planar arrangement with respect to the first arm 60 and the door 49. Thus, at the fully open position of the door 49 shown in FIG. 8, the first arm 60, the pivoted second arm 61, the vane 42, and the compressed first and second spring means 63, 67 are disposed between the door 49 and the left side 36 of the trailer 32, out of the way for loading or unloading of the trailer 32. Upon closing the rear door 49, the first spring means 63 acts between the first arm 60 and the second arm 61 to reestablish their mutual orthogonal arrangement, and the second spring means 67 acts between the second arm 61 and the vane 42 to reestablish the appropriate angular air deflecting disposition therebetween.

Referring next to FIG. 9, an alternate embodiment of means for supporting the left side vertical rear air deflector vane 42, for a trailer 32 not having a rear swinging door opening, is comprised of a bracket 70, one of a plurality of vertically space apart brackets 70, rigidly coupled to the rear corner 71 of the trailer 32, to which the vane 42 is rigidly coupled at the appropriate air deflecting angle.

With reference to FIG. 7, FIG. 8, and FIG. 9, each of the vertically spaced apart plurality of vane mounting brackets 59, or, in the alternate embodiment, the brackets 70, are disposed and act in the manner described above. Similarly, the right side vertical rear air deflector vane 43 is supported from the right swinging door 49, or the right rear corner of the trailer 32, by equivalent elements operating in a mirror image to the preceding descriptions of the left side 36 of the trailer 32.

Figure 11:
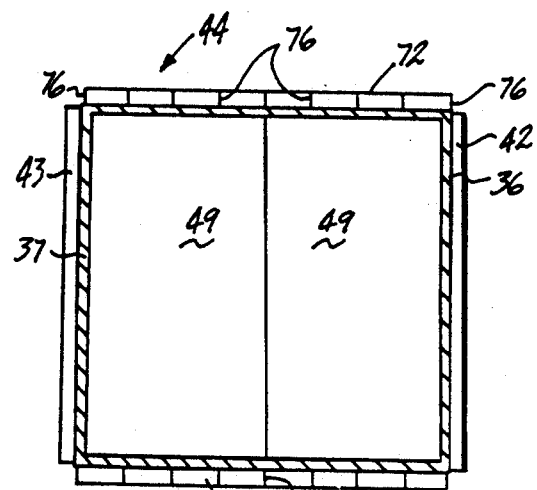
FIG. 11 illustrates a fragmentary transverse cross-section of the upper portion of the trailer and the air scoops of FIG. 12, taken along the plane 11—11 of FIG. 12.

Referring next to FIG. 10 and FIG. 11, additional air is deflected across the rear surface 39 of the trailer 32 by a rear transverse upper air scoop 44 affixed to the top surface 38 of the trailer 32 proximate to its rear edge. The upper air scoop 44 is shown to extend substantially fully across the width of the trailer 32, but lesser transverse extent may be utilized. The upper air scoop 44 is configured as an arcuate element 72 having rearwardly downward curvature adapted to deflect air flowing along proximate to the top surface 38 of the trailer 32, as indicated by an arrow 73, into a substantially downward flow parallel to the rear surface 39 of the trailer 32, as indicated by an arrow 74. As viewed from the front of the vehicle 30, the upper air scoop 44 is configured to have a limited vertical extent above the top surface 38 of the trailer 32, preferably less than three inches. A plurality of transversely spaced apart vertical support elements 76 are adapted to couple the arcuate element 72 to the top surface 38 of the trailer 32. It is to be noted that the rearwardly downward extent of the arcuate element 72 does not go below the top surface 38 of the trailer 32 so that the arcuate element 72 does not interfere with opening and closing of rear swinging doors of the trailer 32. The arcuate element 72, and, as appropriate, the vertical support elements 76, are fabricated from a resilient material so that they may collapse when then rear surface 39 of the trailer 32 is brought into contact with other external structure, such as a loading dock (not illustrated). The resilience enables the arcuate element 72 to resume its illustrated configuration upon removal of contact with such other external structure.

Figure 12:
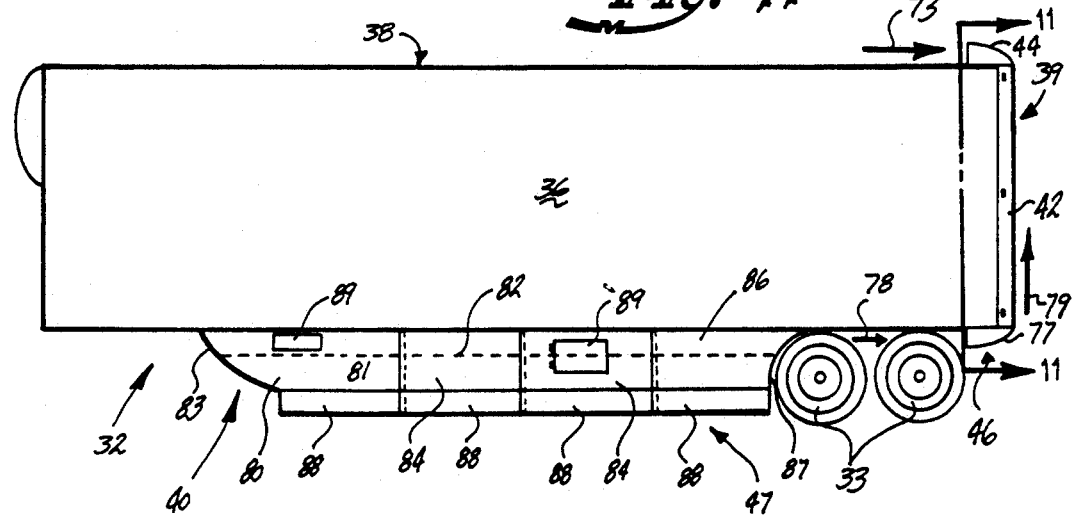
FIG. 12 presents a side view of a trailer equipped with elements of the present invention.

Referring next to FIG. 12, a rear transverse lower air scoop 46 is attached to the lower surface 40 of the trailer 32 proximate to its rear surface 39. The lower air scoop 46, formed from a resilient material as used for the upper air scoop 44, is configured as a rearwardly upward arcuate element 77 adapted to direct air flowing under the vehicle trailer 32, as indicated by an arrow 78, into a substantially upward path parallel to the rear surface 39 of the trailer 32, as indicated by an arrow 79. Appropriate standoff support members 177 are used to hold the lower arcuate element 77 in its position. The lower air scoop 46 has a transverse extent adapted to fit within structure typically affixed to depend from the lower rear edge of the trailer 32.

Additionally, the undercarriage 40 of the vehicle typically contains such equipment as a spare tire, transverse chassis beams, reservoirs for brake systems and the like, and storage of ancillary equipment, all of which serve as baffles to the smooth flow of air beneath the vehicle 30, and which induce a measure of drag. To assist in reducing drag from such sources, an undercarriage enclosure assembly 47 is affixed to the lower surfaces 40 of the trailer 32, generally forward of the rear axles 33 and rearward of interference with the tractor 31 (FIG. 1 and FIG. 2). The undercarriage enclosure assembly 47 is, in the preferred embodiment, comprised of a combination of segments. A forward segment 80 is configured from a substantially rigid material to have side skirts 81 depending from attachment to the lower surface 40 of the trailer 32 proximate to left and right side surfaces 36, 37 of the trailer 32 through a vertical distance approaching the roadway surface, but allowing reasonable road clearance. As shown from below in FIG. 13, the side skirts 81 are joined by a transverse upper panel 82 at the lowest vertical extent of the undercarriage structure and equipment to be enclosed. The forward segment 80 has an open rearward transverse vertical surface area, and is provided with a forwardly convex bulbous closure surface 83 spanning the forward transverse vertical extent of said forward segment 80. The bulbous closure surface 83 is convexly arcuate in directions both forward from the side skirts 81 and upwardly from the lower extent of the side skirts 81. Intermediate segments 84, formed of a like rigid material, are configured to have a pair of side skirts 81 attached, respectively, to the lower surfaces 40 of the trailer 32 in the same manner as those of the forward segment 80, with a similar upper transverse panel 82 spanning the width of the trailer 32. The intermediate segments 84 are provided with open transverse vertical areas at both their front and their rear extents. The intermediate segments 84 are further adapted to marginally overlap that segment disposed immediately forward thereof, and to marginally telescopically insert within a forward extent of a segment disposed immediately to the rear thereof. A rearward segment 86, formed of a like rigid material, is configured and attached to the trailer 32 in the same manner as the intermediate segments 84, with the inclusion of a rearward transverse closure surface adapted to form a wheel well 87 for the forward portion of the most forward of the rear axles 33. For vehicles equipped with a longitudinally slidable rear axle assembly, the rearward segment 86 may be coupled to said axle assembly such that the segments 86 and 84 mutually telescope during the translation of the axle assembly. Each of the side skirts 81 has affixed thereto, at a lowest extent thereof, a side skirt extension panel 88, formed of a resilient material that is restorably deformable upon contact with roadway irregularities. The side skirt extension panels 88 depend from their respective side skirts 81 to an elevation proximate to, but above, the roadway surface.

The number of intermediate segments 84 utilized for a particular trailer 32 depends upon the longitudinal dimension of the trailer 32, from its forward interference station to the rear of the tractor to the rear axles 33 of the trailer 32. Thus, trailers of several lengths may be equipped with the undercarriage enclosure assembly 47 without resort to special fabrication of integral undercarriage enclosures of differing lengths. Of course, fabrication of the assembly 47 as an integral unit may be accomplished, if desired. Additionally, the side skirts 81 may be equipped with latchable access door panels 89 to provide access to storage areas and vehicle equipment within the undercarriage enclosure assembly 47 volume.

Figure 13:
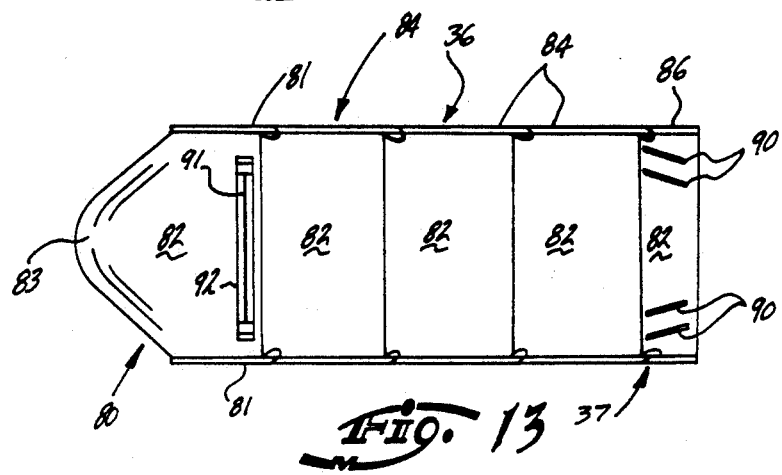
FIG. 13 shows a bottom view of undercarriage enclosure elements in accordance with the present invention.

Referring briefly to FIG. 13, The rearmost segment 86, or the rearmost surface of an integral assembly 47, may be provided with flow directing vanes 90 to guide a portion of the air flowing under the vehicle away from directly in front of the wheels carried by the rear axles 33, said air being channeled to pass between the transverse separation between left and right wheels on the same axle. Some of this channeled air may be directed to intake ports of the lower air scoop 46. Additionally, for trailers so adapted, the forward segment 80 may extend forward of the landing gear 91 used to support the trailer 32 when detached from the tractor 31. In such an arrangement, the landing gear 91 may descend through an appropriate slot 92 in the upper transverse panel 82, and provision is made for inserting a landing gear crank through the side skirt 81 at an appropriate location.

Figure 14:
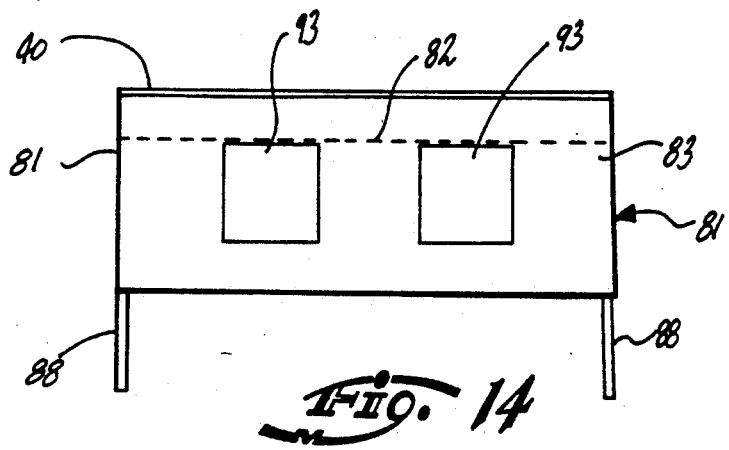
FIG. 14 illustrates, in a fragmentary view taken from the front of a trailer, a first alternate embodiment of the undercarriage enclosure elements in accordance with the present invention.

Referring next to FIG. 14, in an alternate embodiment, the forward bulbous closure 83 of the undercarriage enclosure assembly 47 is provided with at least a pair of ducted openings 93 leading to the partially enclosed volume beneath the upper transverse panel 82 so that air may be trapped therein at an increased pressure greater than that of the surrounding ambient external air, thereby inhibiting drag inducing counter air flows into the partially enclosed volume through other access openings, such as the access doors 89, or through seams between segments 80, 84, 86.

Figure 15:
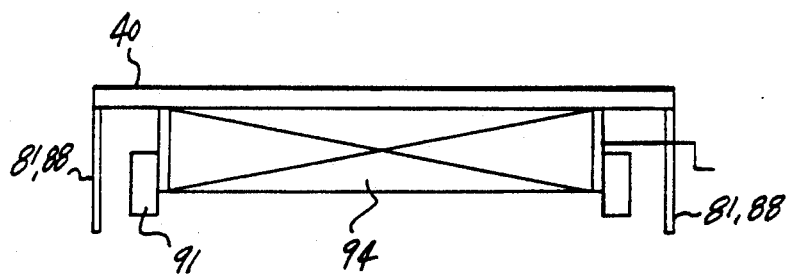
FIG. 15 illustrates, in a fragmentary view taken from the front of a trailer, a second alternate embodiment of the undercarriage enclosure elements in accordance with the present invention.

Referring next to FIG. 15, for those vehicles wherein the landing gear 91 is forward of the forward extent of the undercarriage enclosure assembly 47, or wherein the undercarriage enclosure assembly 47 is omitted, side skirts 81 and side skirt extension panels 88 depend from the lower surface of the trailer 32 without the presence of an upper transverse panel element 82 (FIG. 13). An air deflecting panel element 94 is a affixed transversely to the supporting structure for the landing gear 91 to direct the air to flow below the landing gear 91 or between each leg of the landing gear 91 and its corresponding proximate side skirt 81.

Figure 16:
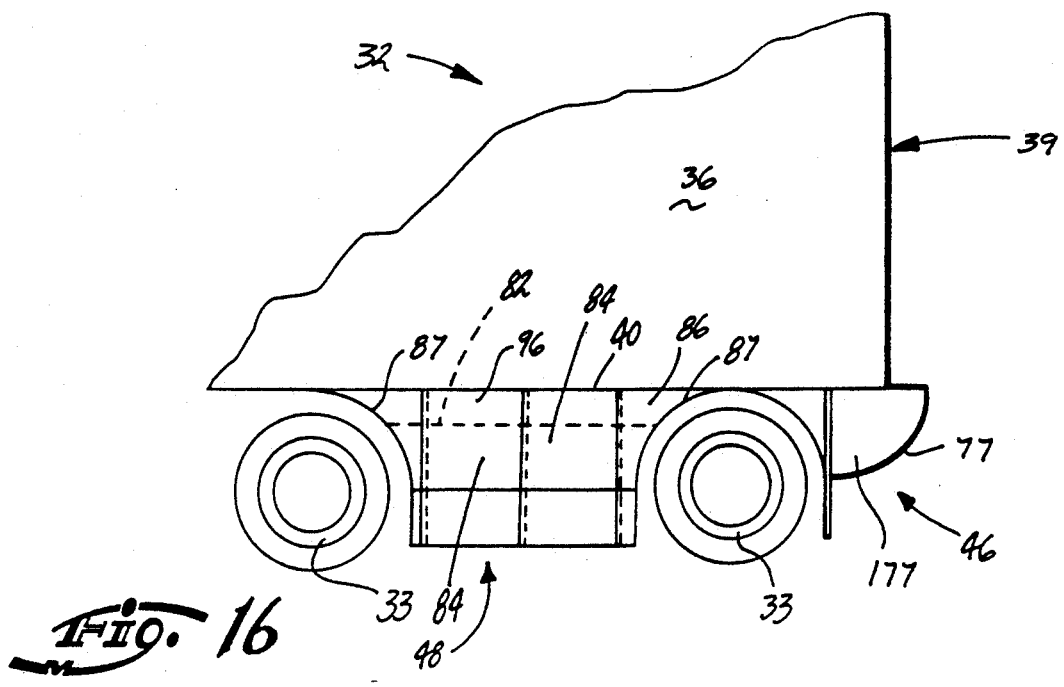
FIG. 16 shows a fragmentary side view of a secondary undercarriage enclosure element adapted for use on a trailer vehicle equipped with longitudinally spaced apart rear axles, and a lower air scoop element in accordance with the present invention.
Figure 10A:
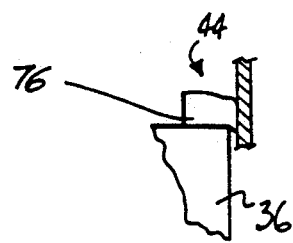
FIG. 10a presents a fragmentary side view of the upper rear corner of the trailer equipped with the upper air scoop element as shown in FIG. 10, with the air scoop element abutting a rigid surface.
Figure 17:
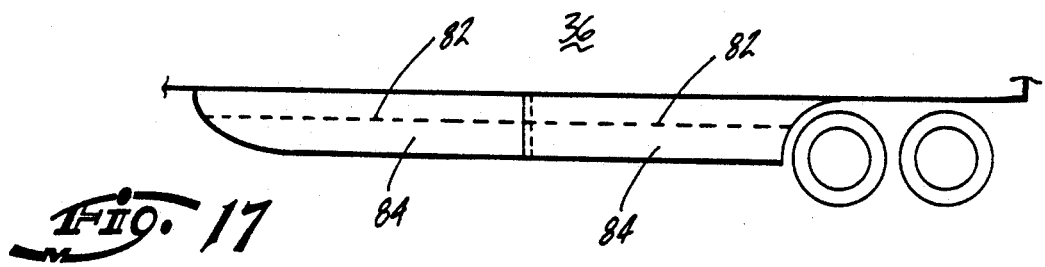
FIG. 17 presents a fragmentary side view of a trailer equipped with elements of the present invention.
Figure 18:
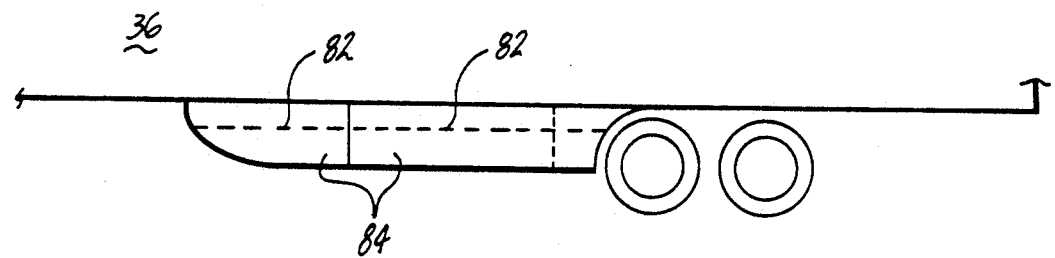
FIG. 18 presents a fragmentary side view of a trailer equipped with elements of the present invention.
Figure 16A:
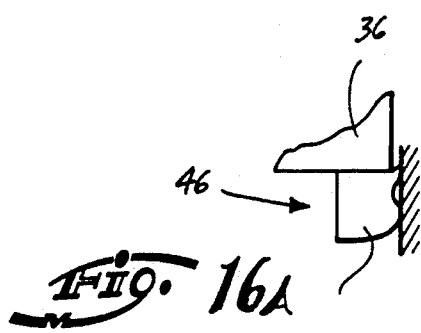
FIG. 16a shows a fragmentary side view of the lower rear corner of the trailer of FIG. 16, with the lower air scoop element abutting a rigid surface.

Referring lastly to FIG. 16, certain vehicles and trailers are equipped with longitudinally separated rear axles 33 to accommodate particular load configurations. Other such trailers have a plurality of rear axles 33 mounted on an assembly that permits sliding that assembly to a desired longitudinal station for load carrying optimization. The present invention provides a secondary undercarriage enclosure assembly 48 to be attached to the lower surface of the trailer 32 between such separated rear axles 33, or following to the rear of such slidable assembly. The assembly 48 consists of a rearward segment 86, as previously described, and a secondary forward segment 96, configured substantially as a reversed rearward segment 86, having a forward oriented wheel well 87 and a centrally transverse closure surface arcuately directing air flow downward under the secondary enclosure assembly 48. For vehicles having a large separation between such rear axles 33, one or more intermediate segments 84 are incorporated to provide enclosure for substantially the entire longitudinal separation between rear axles 33.

While the foregoing descriptions have disclosed a preferred embodiment of the present invention, along with alternate embodiments of several subsystems thereof, it is envisioned that additional alternate embodiments of the several subsystems will be evident. All such further embodiments, and combinations of such alternate embodiments with preferred subsystems are considered to be within the scope of the present invention.

Moreover, the above descriptions have been substantially limited to consideration of semi-trailer vehicles, consisting of a tractor and a separable trailer having only rear axles. It is thus additionally envisioned that the several subsystems of the present invention, or their alternate embodiments, may be incorporated singly or in any combination onto trucks having a cargo body mounted on the vehicle chassis, onto tandem full trailers, onto motor homes, and onto other similar vehicles wherein fuel economy considerations warrant drag reduction efforts.

Thus, in all applications of utilization of the present invention, or combinations of subsystems thereof, including utilizations combining other known drag reduction subsystems, the scope of the present invention is to be limited solely by the claims appended hereto.

I claim:

1. A vehicle drag reduction system, for installation on a vehicle presenting a large forward aspect surface area and a substantially planar vertical rear transverse surface, comprising:

means, attachable to a substantially planar forward facing vertical surface area of said vehicle, said planar surface being oriented to be substantially transverse with respect to a forward direction of travel of said vehicle, for deflecting an air volume residing forwardly of, and along a path of forward travel of, said vehicle into portions passing along each vertical side surface of said forwardly moving vehicle, a portion passing longitudinally over a top surface of said forwardly moving vehicle;

means for deflecting a portion of air passing along a left side surface of said forwardly moving vehicle so as to cause said portion of air to flow substantially horizontally across, and external with respect to, a rear transverse vertical surface of said vehicle;

means for supporting, from a generally vertical left rear corner of said vehicle, said means for deflecting a portion of air passing along said left side surface of said forwardly moving vehicle;

means, mirror imaging said means for deflecting a portion of air passing along said left side surface of said forwardly moving vehicle, for deflecting a portion of air passing along a right side surface of said forwardly moving vehicle so as to cause said portion of air to flow substantially horizontally across, and external with respect to, a rear transverse vertical surface of said vehicle;

means for supporting, from a generally vertical right rear corner of said vehicle, said means for deflecting a portion of air passing along said right side surface of said forwardly moving vehicle;

means, attached to a transverse upper rear corner of said vehicle, for deflecting a portion of air passing longitudinally over the top of said forwardly moving vehicle so as to cause said portion of air to flow substantially vertically downwardly across, and external with respect to, said rear transverse vertical surface of said vehicle;

means, attached to a transverse lower rear corner of said vehicle, for deflecting a portion of air passing longitudinally beneath said forwardly moving vehicle so as to cause said portion of air to flow substantially vertically upward across, and external with respect to, said rear transverse vertical surface of said vehicle;

means, depending from and attached to an undercarriage structure of said vehicle, for enclosing said undercarriage structure within a housing extending substantially from a forwardmost longitudinal station that is non-interfering with operation of said vehicle to a rearmost longitudinal station proximate to, but forward from, a most forwardly disposed rear axle and wheel assembly of said vehicle, said housing having a transverse dimension substantially equal to a width of said vehicle and a vertical dimension depending from said undercarriage structure of said vehicle to a substantially horizontal planar open area, bounded by left and right vertical side surfaces, sufficiently above a roadway surface on which said vehicle travels so as to provide adequate road clearance, said housing including a substantially horizontal planar surface affixed to said housing below structure, excluding axle assemblies, of said vehicle, said horizontal planar surface being disposed to be above a lowermost extent of said housing, said housing being configured to deflect a volume of air into portions passing along right and left vertical surfaces of said housing, respectively, and a portion passing longitudinally into a volume of said housing below said horizontal planar surface; and flexible side skirt extension panel elements depending, respectively, from a lowermost extent of said right and left vertical side surfaces of said undercarriage housing to non-contacting proximity with said roadway surface, said side skirt extension panel elements having a longitudinal extent substantially equal to the longitudinal extent of said undercarriage housing.

2. The vehicle drag reduction system, as claimed in claim 1, said rear vertical surface being equipped with a pair of rear loading doors pivoting about vertical axes respectively disposed proximate to vertical rear corners of said vehicle, said pivoting rear doors having a fully closed position enclosing said rear transverse vertical surface of said vehicle and a fully open position whereat left and right of said doors are respectively pivoted, first rearwardly, then outwardly, and lastly forwardly with respect to the vehicle, through substantially 270 degrees of angle to positions disposed to be forwardly extending from said pivoting axes adjacent to corresponding said exterior side surfaces of said vehicle, wherein said means for supporting said means for deflecting a portion of air passing along said left side surface of said forwardly moving vehicle and said means for supporting said means for deflecting a portion of air passing along said right side surface of said forwardly moving vehicle each comprise a plurality of vertically spaced apart mounting assemblies, each consisting of:

a first arm, affixed to an external surface of a corresponding rear door proximate to its vertical pivot axis;

a second arm, pivotably coupled, at a first end thereof, to an end of said first arm most proximate to the pivot axis of the corresponding door to which said first arm is attached, said axis of pivoting of said second arm being substantially vertical so that said second arm may pivot thereabout between a use position, when said doors are fully closed, whereat said second arm extends substantially horizontally to a distal end thereof in a direction longitudinally rearwardly from said rear surface of said vehicle, and a vehicle loading position, whereat said second arm is pivoted about its axis to be substantially parallel with said first arm and between said first arm and the corresponding proximate external vertical side surface of the vehicle, in said fully open position of said door;

first spring biasing means, acting between said first arm and said second arm, for maintaining, in said use position, said second arm in a horizontally orthogonal relationship with said first arm, and for reestablishing said orthogonal relationship as the door to which the corresponding first arm is attached is closed from its fully open position;

pivot means, affixed to said distal end of said second arm and providing a substantially vertical pivot axis thereat, for coupling to said means for deflecting a portion of air passing along the corresponding vertical side surface of said forwardly moving vehicle, said pivoting allowing said deflecting means to be pivoted from a deflecting position thereof, when said door is fully closed, to a loading position thereof between said corresponding vertical side surface of said vehicle and said pivoted second arm when said door is fully open; and second spring biasing means, acting between said second arm and said deflecting means, for maintaining said deflecting means at an angularly pivoted orientation relative to said second arm for proper air deflection when said door is fully closed, and for reestablishing said proper deflecting angular orientation as said door is closed from its fully open position.

3. The vehicle drag reduction system, as claimed in claim 1, said rear vertical surface being immovable relative to said vehicle, wherein said means for supporting said means for deflecting a portion of air passing along said left side surface of said forwardly moving vehicle and said means for supporting said means for deflecting a portion of air passing along said right side surface of said forwardly moving vehicle each comprise a plurality of vertically spaced apart mounting brackets, each rigidly coupled to the corresponding left or right rear vertical corner of said vehicle so as to extend substantially horizontally rearwardly therefrom to respective distal ends, said deflecting means being rigidly coupled to the distal ends of the corresponding plurality of vertically spaced apart mounting brackets so as to be oriented at a proper deflecting angular position about a vertical axis.

4. The vehicle drag reduction system as claimed in claim 1, wherein said means for deflecting a portion of air passing along said left side surface of said forwardly moving vehicle so as to cause said portion of air to flow substantially horizontally across, and external with respect to, a rear transverse vertical surface of said vehicle comprises a vertically extending first vane element, having a vertical extent substantially equal to that of the vertical left side surface of the vehicle, said first vane element having a width sufficient to have a first vertical edge thereof, disposed outboard from the left side surface of the vehicle by a distance appropriate to capture a portion of the air flowing along the side of the forwardly moving vehicle without exceeding the overall legal width limits of the vehicle, and a second, obverse, vertical edge of said first vane element, disposed rearwardly from said vertical transverse rear surface of said vehicle and inboard of said left side surface of said vehicle; and wherein said means for deflecting a portion of air passing along a right side surface of said forwardly moving vehicle so as to cause said portion of air to flow substantially horizontally across, and external with respect to, a rear transverse vertical surface of said vehicle comprises a vertically extending second vane element configured as a mirror image of said first vane element, mirrored about a vertical plane passing longitudinally to bisect said vehicle.

5. The vehicle drag reduction system as claimed in claim 4, wherein said first vane element is formed to have a horizontal cross-section presenting an arcuate concave forward surface having an axis of curvature disposed both forwardly and inboardly right of said first vane element; and wherein said second vane element is formed to have a horizontal cross-section presenting an arcuate concave forward surface having an axis of curvature disposed both forwardly and inboardly left of said second vane element.

6. The vehicle drag reduction system as claimed in claim 5, wherein substantially 90 degrees of arc are included in said arcuate concave forward surfaces of said horizontal cross-sections of each of the first and the second vane elements.

7. The vehicle drag reduction system as claimed in claim 1, wherein said means for deflecting a portion or air passing longitudinally over the top of said forwardly moving vehicle comprises:

a transversely spaced apart plurality of substantially planar vertical support members respectively attached to said top surface of said vehicle at an upper rear corner thereof such that the vertical plane of each such vertical support member is generally longitudinally aligned with respect to said vehicle, each of said vertical support members being configured to have a vertical extent above said top surface of said vehicle limited to be less than three inches, with a rearwardly trailing edge having a downwardly arcuate shape, a lowermost edge of each of said vertical support members extending longitudinally rearward from said rear vertical transverse surface of said vehicle, all portions of each support member being constrained to be at an elevation not less than the top surface of said vehicle; and an arcuate scoop member, having an extent parallel to an axis of curvature thereof less than said width of said vehicle, said scoop member being attached to uppermost and rearmost arcuate edges of respective members of said plurality of vertical support members, said axis of curvature being disposed to be transversely orthogonal to a vertical longitudinal plane of said vehicle.

8. The vehicle drag reduction system as claimed in claim 7, wherein said vertical support members and said arcuate scoop member are fabricated from a resiliently deformable material.

9. The vehicle drag reduction system as claimed in claim 1, wherein said means for deflecting a portion of air passing longitudinally beneath said forwardly moving vehicle comprises:

a plurality of substantially planar vertical support members, spaced apart across the width of the vehicle, respectively attached, at uppermost edges thereof, to said lower surface of said vehicle at a lower rear corner thereof such that a vertical plane of each such vertical support member is generally longitudinally aligned with respect to said vehicle, with a rearwardly trailing edge having an upwardly arcuate shape, said uppermost edge of each of said vertical support members extending longitudinally rearward from said rear vertical transverse surface of said vehicle, said uppermost edge of each support member being constrained not to extend higher than said lower surface of said vehicle; and an arcuate scoop member, having an extent in the direction of the width of the vehicle less than said width of said vehicle, said scoop member being attached to lowermost and rearmost arcuate edges of respective members of said plurality of vertical support members.

10. The vehicle drag reduction system as claimed in claim 9, wherein said vertical support members and said arcuate scoop member are fabricated from a resiliently deformable material.

11. The vehicle drag reduction system as claimed in claim 1, wherein said means for enclosing said undercarriage structure within a housing comprises:

a substantially rectangularly shaped left side skirt member, formed of a thin, rigid planar material, coupled to and depending from said lower surface of said vehicle so as to be substantially coplanar with said left side surface of said vehicle, said left side skirt member having a vertical extent;

a substantially rectangularly shaped right side skirt member, formed of a thin, rigid planar material, rigidly attached to and depending from said lower surface of said vehicle so as to be substantially coplanar with said right side surface of said vehicle, said right side skirt member having a vertical extent;

a substantially rectangularly shaped upper panel member, formed of a thin, rigid planar material, dimensioned to have a longitudinal extend equal to the longitudinal extent of said left and right side skirt members and an extend transverse with respect to said vehicle substantially equal to the width of said vehicle between said left and said right side skirt members, said upper panel member being disposed to be substantially horizontally planar and attached to said left and said right side skirt members at an elevation below said lower surface, but generally above a lowermost extend of said skirt members;

a forward closure member, configured, from a thin, rigid material, in attachment to forwardmost vertical edges of said left and said right side skirt members said forward closure member including a substantially horizontal planar element at an elevation corresponding to the upper panel member to abuttingly mate therewith; and a rear closure member, configured, from a thin, rigid material, as a substantially transverse structure rigidly attached to rearmost vertical edges of said left and said right said skirt members and to a rearmost horizontally transverse edge of said upper panel member to extend rearwardly and upwardly therefrom into coupling attachment with said lower surface of said vehicle, with a generally concave rearward curvature forming wheel wells for wheels carried by said most forward rear axle of said vehicle, said rear closure member having means to direct a portion of the air flow beneath said housing into a path passing between opposed wheels of said most forward rear axle of said vehicle.

12. The vehicle drag reduction system as claimed in claim 1, wherein said means for enclosing said undercarriage structure within a housing further comprises:

a forward segment comprised of a left side fore skirt member, formed of a thin, rigid planar material, coupled to and depending from said lower surface of said vehicle so as to be substantially coplanar with said left side surface of said vehicle, said left side fore skirt member having a vertical extent and having a longitudinal extent that is a fraction of the longitudinal extent of the housing structure, an equally short like right side fore skirt member, coupled to and depending from said lower surface of said vehicle so as to be substantially coplanar with said right side of said vehicle, said right side fore skirt member having a vertical extent and a longitudinal extent substantially equal to said left side fore skirt member, said left and right side fore skirt members being in substantial transverse mutual registration, an equally short fore upper panel member, formed of a thin rigid planar material, dimensioned to have a longitudinal extent equal to the longitudinal extent of said left and right side fore skirt members and an extent transverse with respect to said vehicle substantially equal to the width of said vehicle between said left and right side fore skirt members, said upper panel member being disposed to be substantially horizontally planar and attached to said left and right side fore skirt members at an elevation below said lower surface of said vehicle, but generally above a lowermost extent of said fore skirt members, and a forward closure member;

a rearward segment, comprised of a left side aft skirt member having a longitudinal extent that is a fraction of the longitudinal extent of the housing structure, an equally short right side aft skirt member, an equally short aft upper panel member, and a rear closure member, coupled to and depending from said lower surface of said vehicle; and a plurality of intermediate segments, each comprised of a left side mid skirt member having a longitudinal extent that is a fraction of the longitudinal extent of the housing structure, an equally short right side mid skirt member, and an equally short mid upper panel member, the number of intermediate segments being determined by vehicle length;

said forward segment, said rearward segment, and said plurality of intermediate segments being adapted to longitudinally overlappingly mate to form said undercarriage housing below said lower surface of said vehicle.

13. The vehicle drag reduction system as claimed in claim 12, wherein rearmost edges of said segments and forwardmost edges of said segments are respectively adapted such that the forwardmost end of each segment longitudinally overlaps the rearmost end of the segment immediately forward thereof forming a segment overlap.

14. The vehicle drag reduction system as claimed in claim 12, wherein said segment overlaps are adapted to allow air to enter a volume within said housing below said upper panel member.

15. The vehicle drag reduction system as claimed in claim 11, wherein said left and right side skirt members further comprise one or more latchable access doors therethrough.

16. The vehicle drag reduction system as claimed in claim 11, wherein said forward closure member further comprises one or more ducted, forwardly directed air scoop openings into a volume within said housing below said upper panel member.

17. The vehicle drag reduction system as claimed in claim 12, adapted for use between tandem axles on a vehicle having tandem mounted rear axles longitudinally spaced apart by at least six feet, said vehicle drag reduction system further comprising:
an inter-axle segment attached to the lower surface of said vehicle between said tandem axles forming a partially enclosed housing therebetween.

18. An air deflecting subsystem for attachment to a rear surface of a vehicle having a large forward aspect and a substantially planar rear transverse surface equipped with rear loading doors pivoting about vertical axes respectively disposed proximate to left and right vertical rear corners of said vehicle, sid pivoting rear doors having a fully closed position enclosing said rear transverse vertical surface of said vehicle and a fully open position whereat left and right doors are respectively pivoted, first rearwardly, then outwardly relative to said vehicle, and lastly forwardly, through substantially 270 degrees of angle to positions disposed to be forwardly extending from sid pivoting axes and adjacent to corresponding exterior left and right side surfaces of said vehicle, comprising:
an even plurality of first arms, half of said plurality affixed, in a vertically spaced apart manner, to an external surface of said left rear door proximate to its vertical pivot axis, and the other half of said plurality affixed, in a like vertically spaced apart manner to an external surface of said right rear door proximate to its vertical pivot axis;
a like plurality of second arms, each respectively pivotably coupled, at a first end thereof, to an end of a corresponding one of said first arms most proximate to the pivot axis of the corresponding door to which said first arm is attached, said axis of pivoting of said second arm being substantially vertical so that said second arm may pivot thereabout between a use position, when said doors are fully closed, whereat said second arm extends substantially horizontally to a distal end thereof in a direction longitudinally rearwardly from said rear surface of said vehicle, and a vehicle loading position, whereat said second arm is pivoted about its axis to be substantially parallel with said first arm and between said first arm and the corresponding proximate external vertical side surface of the vehicle, in said fully open position of said door;
a like plurality of first spring biasing means, each respectively acting between a corresponding one of said first arms and a corresponding one of said second arms, for maintaining, in said use position, said second arm in a horizontally orthogonal relationship with said first arm, and for reestablishing said orthogonal relationship as the door to which the corresponding first arm is attached is closed from its fully open position;
a like plurality of pivot means, each correspondingly affixed to said distal end of a corresponding one of said second arms and providing a substantially vertical pivot axis thereat, for coupling to corresponding left and right means for deflecting a portion of air passing along the corresponding vertical side surface of said forwardly moving vehicle, said pivoting allowing said deflecting means to be pivoted from an air deflecting position thereof, when said corresponding door is fully closed, to a loading position thereof between said corresponding vertical side surface of said vehicle and said pivoted second arm when said door is fully open; and
a like plurality of second spring biasing means, each respectively acting between a corresponding one of said second arms and said corresponding deflecting means, for maintaining said deflecting means at an angularly pivoted orientation relative to said second arm for proper air deflection when said door is fully closed, and for reestablishing said angularly pivoted orientation as said door is closed from its fully open position.

19. An air deflecting subsystem for attachment proximate to an upper rear vertical transverse surface of a vehicle, for deflecting a portion of air passing longitudinally over a top surface of a forwardly moving vehicle comprises:
a transversely spaced apart plurality of substantially planar vertical support members respectively attached to said top surface of said vehicle at an upper rear corner thereof such that the vertical plane of each such vertical support member is generally longitudinally aligned with respect to said vehicle, each of said vertical support members being configured to have a vertical extent above said top surface of said vehicle limited to be less than three inches, with a rearwardly trailing edge having a downwardly arcuate shape, a lowermost edge of each of said vertical support members extending rearward from said rear vertical transverse surface of said vehicle by substantially approximately three inches, each support member being limited to be entirely not lower than said top surface of said vehicle; and
an arcuate scoop member, having an extent parallel to an axis of curvature thereof less than said width of said vehicle, said scoop member being attached to uppermost and rearmost arcuate edges of respective members of said plurality of vertical support members, said axis of curvature being disposed to be transversely orthogonal to a vertical longitudinal plane of said vehicle.

20. The air deflecting subsystem as claimed in claim 19, wherein said vertical support members and said arcuate scoop member are fabricated from a resiliently deformable material.

21. An air deflecting subsystem for attachment at the rear of a vehicle, for deflecting a portion of air passing longitudinally beneath said forwardly moving vehicle so as to cause said portion of air to flow substantially vertically upward across, and external with respect to, a rear transverse vertical surface of said vehicle, which subsystem comprises:
a transversely spaced apart plurality of substantially planar vertical support members respectively attached, at uppermost edges thereof, to said lower surface of said vehicle, spaced apart along a lower rear corner thereof such that the vertical plane of each such vertical support member is generally longitudinally aligned with respect to said vehicle, each of said vertical support members being configured to have a vertical extent below said lower surface of said vehicle, with a rearwardly trailing edge having an upwardly arcuate shape, an uppermost edge of each of said vertical support members extending longitudinally rearward from said rear vertical transverse surface of said vehicle by approximately three inches, said uppermost edge of each support member being limited to be entirely below said lower surface of said vehicle; and an arcuate scoop member, having an extent transverse to said vehicle which is less than said width of said vehicle, said scoop member being attached to lowermost and rearmost arcuate edges of respective members of said plurality of vertical support members.

22. The air deflecting subsystem as claimed in claim 21, wherein said vertical support members and said arcuate scoop member are fabricated from a resiliently deformable material.

23. A drag reducing subsystem for attachment onto a forwardly moving vehicle, traveling on wheels supported by axles, with an undercarriage structure, said subsystem comprising means, depending from and attached to an undercarriage structure of said vehicle, for enclosing said undercarriage structure within a housing extending substantially from a forwardmost longitudinal station that is non-interfering with operation of said vehicle to a rearmost longitudinal station proximate to, but forward from, a most forwardly disposed rear axle and wheel assembly of said vehicle, said housing having a transverse dimension substantially equal to a width of said vehicle and a vertical dimension depending from said undercarriage structure of said vehicle to a substantially horizontal planar surface defining thereunder a lower open area, thereby forming a partially enclosed volume, said housing including a substantially horizontal planar surface disposed below said vehicle, said housing being configured to deflect a volume of air overridden by a tractor associated with said forwardly moving vehicle, said air volume being deflected into portions passing along right and left vertical surfaces of said housing, respectively, and a portion passing longitudinally into the partially enclosed volume below said horizontal planar surface of said housing.

24. The vehicle drag reducing subsystem as claimed in claim 23, wherein said said means for enclosing said undercarriage structure within a housing comprises:
 a substantially rectangularly shaped left side skirt member, formed of a thin, rigid planar material, coupled to and depending from said lower surface of said vehicle so as to be substantially coplanar with said left side surface of said vehicle, said left side skirt member having a vertical extent;
 a substantially rectangularly shaped right side skirt member, formed of a thin, rigid planar material, coupled to and depending from said lower surface of said vehicle so as to be substantially coplanar with said right side surface of said vehicle, said right side skirt member having a vertical extent; said right side skirt member being in transverse longitudinal registration with said left side skirt member;
 a substantially rectangularly shaped upper panel member, formed of a thin, rigid planar material, dimensioned to have a longitudinal extent equal to the longitudinal extent of said left and right side skirt members and an extent transverse with respect to said vehicle substantially equal to the width of said vehicle between said left and said right side skirt members, said upper panel member being disposed to be substantially horizontally planar and attached to said left and said right side skirt members at an elevation below said vehicle;
 a forward closure member, configured, formed from a thin, rigid material, to be in rigid attachment to forwardmost vertical edges of said left and said right side skirt members and in coupled attachment with said lower surface of said vehicle, said forward closure member including a substantially horizontal panel element disposed at an elevation providing abutting mating with said upper panel member; and
 a rear closure member, configured, from a thin, rigid material, as a substantially transverse structure rigidly attached to rearmost vertical edges of said left and said right side skirt members and to a rearmost horizontally transverse edge of said upper panel member to extend rearwardly and upwardly therefrom into coupling attachment with said lower surface of said vehicle, forming wheel wells for wheels carried by a most forward rear axle of said vehicle, said rear closure member having means to direct air flow beneath said housing into a path passing centrally between opposed wheels of said most forward rear axle of said vehicle.

25. The vehicle drag reducing subsystem as claimed in claim 23, wherein said means for enclosing said undercarriage structure within a housing comprises:
 a forward segment, comprised of a longitudinally short left side skirt member, formed of a thin, rigid planar material, coupled to and depending from said under carriage structure of said vehicle so as to be substantially coplanar with a left side surface of said vehicle, said left side skirt member having a vertical extent, a short right side skirt member, formed of a thin, rigid planar material, coupled to and depending from said lower surface of said vehicle so as to be substantially coplanar with a right side surface of said vehicle, said right side skirt member having a vertical extent, said left and said right short skirt members being disposed to be in substantial mutual transverse registration relative to said vehicle, a short upper panel member defining said horizontal planar surface, formed of a thin, rigid planar material, dimensioned to have a longitudinal extent equal to the longitudinal extent of the left and right side skirt members and an extent transverse with respect to said vehicle substantially equal to the width of said vehicle between said left and said right side skirt members, said upper panel member being attached to said left and said right skirt members at an elevation below said under carriage structure of said vehicle, and a forward closure member;
 a rearward segment, comprised of a short left side skirt member, a short right side skirt member, a short upper panel member, and a rear closure member; and
 a plurality of intermediate segments, each comprised of a short left side skirt member, a short right side skirt member, and a short upper panel member, the number of intermediate segments being determined by vehicle length.

26. The vehicle drag reducing subsystem as claimed in claim 25, wherein rearmost edges of said segments and forwardmost edges of said segments are arranged such that the forwardmost end of each segment longitudinally overlaps the rearmost end of the segment immediately forward thereof forming an overlap.

27. The vehicle drag reducing subsystem as claimed in claim 26, wherein said overlaps between adjacent segments are adapted to allow air to enter said housing.

28. The vehicle drag reducing subsystem as claimed in claim 24, wherein said side skirt members further comprise one or more latchable access doors therethrough.

29. The vehicle drag reducing subsystem as claimed in claim 24, wherein said forward closure member further comprises one or more ducted, forwardly directed air scoop openings into said volume within said housing.

30. The vehicle drag reducing subsystem as claimed in claim 24, further comprising flexible side skirt extension panel elements depending, respectively, from a lowermost extent of said right and left vertical side surfaces of said undercarriage housing to non-contacting proximity with said roadway surface, said side skirt extension panel elements having a longitudinal extent substantially equal to the longitudinal extent of said undercarriage housing.

31. The vehicle drag reduction subsystem as claimed in claim 25, adapted for use on a vehicle having tandem mounted rear axles longitudinally spaced apart by at least six feet, further comprising:
   a first rearward segment, attached to the lower surface of said vehicle to be proximately forward of the rearmost tandem axle;
   a second rearward segment, attached to the lower surface of said vehicle in a reversed orientation to the first rearward segment to be proximately rearward of the forwardmost tandem axle; and
   an appropriate plurality of intermediate segments, attached to the lower surface of said vehicle longitudinally placed to be between said first rearward segment and said second reversed rearward segment so as to form a partially enclosed wheel housing extending longitudinally between said tandem axles.

32. The vehicle drag reduction system as claimed in claim 11, adapted for a vehicle equipped with a rear axle assembly that may be slidably repositioned longitudinally along the vehicle, wherein said housing shirt members are capable of telescoping to accommodate length variations as said rear axle assembly is slidably repositioned.

33. The vehicle drag reduction subsystem as claimed in claim 24, adapted for a vehicle equipped with a rear axle assembly that may be slidably repositioned longitudinally along the vehicle, wherein said housing skirt members are capable of telescoping to accommodate length variations as said rear axle assembly is slidably repositioned.

34. The vehicle drag reduction system as claimed in claim 12, wherein said left and right side skirt members of the several segments further comprise one or more latchable access doors therethrough.

35. The vehicle drag reducing subsystem as claimed in claim 25, wherein said side skirt members further comprise one or more latchable access doors therethrough.

36. The vehicle drag reducing subsystem as claimed in claim 24, wherein said forward closure member further comprises one or more ducted, forwardly directed air scoop openings into said volume within said housing.

37. A deflecting subsystem for attachment to a vehicle having a longitudinal side surface, a rear transverse surface and a rear corner therebetween, the rear side air deflecting subsystem comprising:
   an arm pivotably attached to the rear transverse surface of the vehicle, and having an arm operating position with respect to the rear transverse surface;
   a vane pivotably mounted to the arm, the vane having a vane operating position with respect to the arm, the vane being curved to deflect a flow of air passing along the longitudinal side surface of the vehicle across the rear transverse surface when the arm is in the arm operating position and the vane is in the vane operating position;
   an arm biasing means for rotatably biasing the arm about its pivot attachment into the arm operating position; and
   a vane biasing means for rotatably biasing the vane about its pivot attachment into the vane operating position.

38. A deflecting subsystem according to claim 37 wherein the vane biasing means comprises a spring between the vane and the arm, and the arm biasing means comprises a spring between the arm and the rear transverse surface of the vehicle.

39. A deflecting subsystem according to claim 37 wherein the vane comprises an elongated plate, curved in the transverse direction, and longitudinally aligned with the rear corner of the vehicle.

40. A deflecting subsystem for use on a vehicle having a longitudinal side surface, a rear transverse surface, a rear corner therebetween, and at least one rear door forming the rear surface, the door being substantially vertically oriented and pivotable about a vertical axis adjacent the rear corner of the vehicle, the door having a closed position wherein the door at least partially forms the rear transverse surface, and the door being pivotable through more than 180 degrees to an open position, the deflecting subsystem comprising:
   an arm pivotably attached to the door, and having an arm operating position with respect to the door;
   a vane pivotably mounted to the arm, the vane having a vane operating position with respect to the arm, the vane being curved to deflect a flow of air passing along the longitudinal side surface of the vehicle across the rear transverse surface when the arm is in the arm's operating position and the vane is in the vane operating position; and
   the arm being sufficiently pivotable, and the vane being sufficiently pivotable, to allow the door to pivot from its closed position to its open position.

41. A vehicle and drag reduction system, the vehicle comprising a forward surface, a substantially vertically oriented left side surface, a substantially vertically oriented right side surface, a substantially vertically oriented rear transverse surface, and left and right rear corners between rear transverse surface and the left and right side surfaces respectively, the rear side air deflecting subsystem comprising:
   an arm pivotably attached to the rear transverse surface of the vehicle, and having an arm operating position with respect to the rear transverse surface;
   a vane pivotably mounted to the arm, the vane having a vane operating position with respect to the arm, the vane being curved to deflect a flow of air passing along one of the side surfaces of the vehicle across the rear transverse surface when the arm is in the arm operating position and the vane is in the vane operating position;

an arm biasing means for rotatably biasing the arm about its pivot attachment into the arm operating position; and a vane biasing means for rotatably biasing the vane about its pivot attachment into the vane operating position.

* * * * *